(12) United States Patent
Kata

(10) Patent No.: US 7,025,581 B2
(45) Date of Patent: Apr. 11, 2006

(54) TIRE VULCANIZING MOLD

(75) Inventor: Takehiro Kata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 4 days.

(21) Appl. No.: 10/484,006

(22) PCT Filed: Jul. 17, 2002

(86) PCT No.: PCT/JP02/07125

§ 371 (c)(1),
(2), (4) Date: Jan. 16, 2004

(87) PCT Pub. No.: WO03/008169

PCT Pub. Date: Jan. 30, 2003

(65) Prior Publication Data

US 2004/0170715 A1 Sep. 2, 2004

(30) Foreign Application Priority Data

Jul. 17, 2001 (JP) .............................. 2001-216641

(51) Int. Cl.
B29C 35/02 (2006.01)
(52) U.S. Cl. ........................................ 425/46; 425/812
(58) Field of Classification Search ................ 425/812, 425/47, 46, 39, 28.1
See application file for complete search history.

(56) References Cited

U.S. PATENT DOCUMENTS

| 5,120,209 | A | * | 6/1992 | MacMillan | 425/46 |
| 5,234,326 | A | * | 8/1993 | Galli et al. | 425/46 |
| 5,492,669 | A | * | 2/1996 | Laurent et al. | 425/47 |
| 5,639,326 | A | * | 6/1997 | Soulalioux | 425/46 |
| 5,980,810 | A | * | 11/1999 | Ladouce | 425/46 |
| 6,382,943 | B1 | * | 5/2002 | Metz et al. | 425/46 |
| 6,416,304 | B1 | * | 7/2002 | Tanaka et al. | 425/46 |

FOREIGN PATENT DOCUMENTS

| JP | 5-220748 | * | 8/1993 |
| WO | WO-A 00/20184 | | 4/2000 |

* cited by examiner

Primary Examiner—James P. Mackey
(74) Attorney, Agent, or Firm—Oliff & Berridge, PLC

(57) ABSTRACT

There is provided a vulcanizing mold for a tire in which the capacity of venting air through between the molding pieces of the sector mold is significantly enhanced. A tread ring for vulcanizing and shaping a tread of the tire comprises plural sector molds which are separately formed in the circumferential direction so as to be brought into surface contact with each other. Each of the sector molds comprises segments and plural movable molding pieces circumferentially aligned and disposed on the inner surface side of the segment, and each of the movable molding pieces of each sector mold is urged away from each other.

3 Claims, 2 Drawing Sheets

RELATED ART

TIRE VULCANIZING MOLD

TECHNICAL FIELD

The present invention relates to a vulcanizing mold for a tire, particularly to improvement in tread ring contributing to vulcanizing and shaping of a tire tread for significantly enhancing the capacity of venting air in the mold.

BACKGROUND

For a so-called split mold in which a tread ring comprises plural sector molds separately formed in the circumferential direction, it is widely known, as conventional technique for venting air in the mold, to provide vent holes in the sector molds themselves.

In this technique, the rubber penetrates into the vent holes to yield whisker-like spews which spoils the appearance of the tire thereby requiring a special processing step for cutting and removing a number of spews. Thus, as shown in FIG. 1 by way of example, it is recently proposed to vent air through minute gaps δ between plural fixed molding pieces 22 which are provided on an inner surface side of each sector mold 21 and are circumferentially aligned with each other. In this case, it is considered to be advantageous to improve the capacity of venting air, that vacuum suction means are connected to the minute gaps for a forced ventilation.

In the conventional technique in which air is vented through between the fixed molding pieces 22, however, the piece gaps δ are set to be a small given value so as to prevent the rubber from flowing out and hence the capacity of venting is lower than that of venting air by means of the vent holes, which tends to cause a drawback in the appearance such as bares. This drawback cannot be thoroughly solved due to the piece gaps being too small even though the forced ventilation is carried out by the vacuum suction means.

Further in this case, since the rubber penetrates into the piece gaps δ and hence the gap δ is plugged in the early stage to lower the capacity of venting air, there is a problem that cleaning the mold at a short cycle is inevitable.

The present invention is aimed to solve the above-mentioned drawback of the conventional technique, and an object thereof is to provide a vulcanizing mold for a tire in which the capacity of venting air through between the molding pieces of the sector mold is significantly enhanced to eliminate a possibility of causing the defective appearance such as bares even though almost all or all of the vent holes is removed.

DISCLOSURE OF THE INVENTION

A vulcanizing mold for a tire according to the present invention has a tread ring for vulcanizing and shaping a tread of the tire, the tread ring comprising plural, such as six to eighteen, sector molds which are separately formed in the circumferential direction so as to be brought into surface contact with each other, wherein each of the sector molds comprises arched segments and plural, such as four to eight, movable molding pieces circumferentially aligned with each other and disposed on the inner surface side of the segments, and wherein the movable molding pieces of each sector mold are urged away from each other by a spring member, actuator or the like.

In the vulcanizing mold according to the present invention, the movable molding pieces are largely spaced with each other by the pressing action of the spring member or the like in its open position in which the sector molds are spaced with each other.

Meanwhile, when each of the sector molds is displaced in the radially inward direction to close the vulcanizing mold and the movable molding pieces of the adjacent sector molds contact with each other, each of the movable molding pieces of the sector molds is displaced closely with each other against the pressing force of the spring or, for example, under an inactive state of the actuator and these molding pieces have approached with each other to a predefined small gap at the point of a complete closing position being reached.

Therefore, in the present invention, when a green tire is shaped and vulcanized, the efficiency of venting air can be significantly enhanced by venting air in the mold through between molding pieces having wider clearance until the vulcanizing mold is in a complete closing position, usually after the movable molding pieces of the adjacent sector molds contact with each other and before each of the movable molding pieces in the sector molds approaches with each other to the predefined small gaps, thereby effectively preventing formation of bares or the like without providing few or no vent holes. Such enhancement is particularly outstanding in the case where air is forcibly vented through the predefined small gaps of the molding pieces.

More preferably, in such a vulcanizing mold, a relative clearance of the movable molding pieces is less than 0.05 mm in a position in which the sector molds form the tread ring or, in other words, in a complete closing position. Thus, the clearance is 0.05 mm or more in a position in which the sector molds are spaced with each other or, also in other words, in a opening position.

The former allows air to be vented while the rubber is prevented from flowing out. The latter can realize smooth and effective ventilation of air.

BEST MODE FOR CARRYING OUT THE INVENTION

Figure 1:
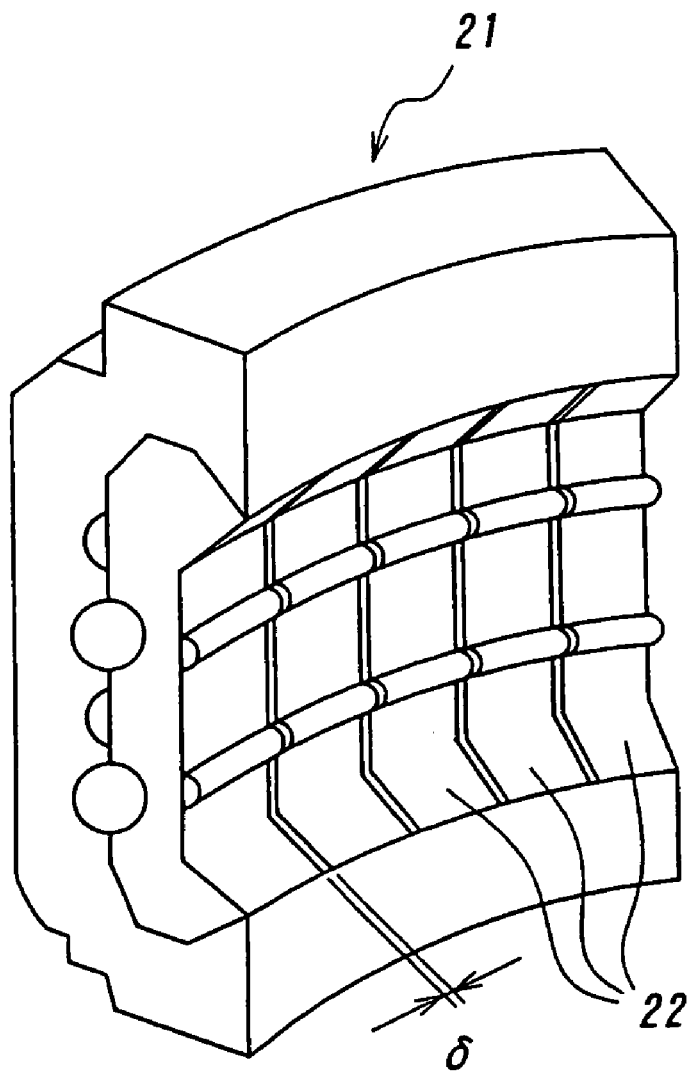
FIG. 1 is a schematic diagram showing a conventional sector mold.
Figure 2A:
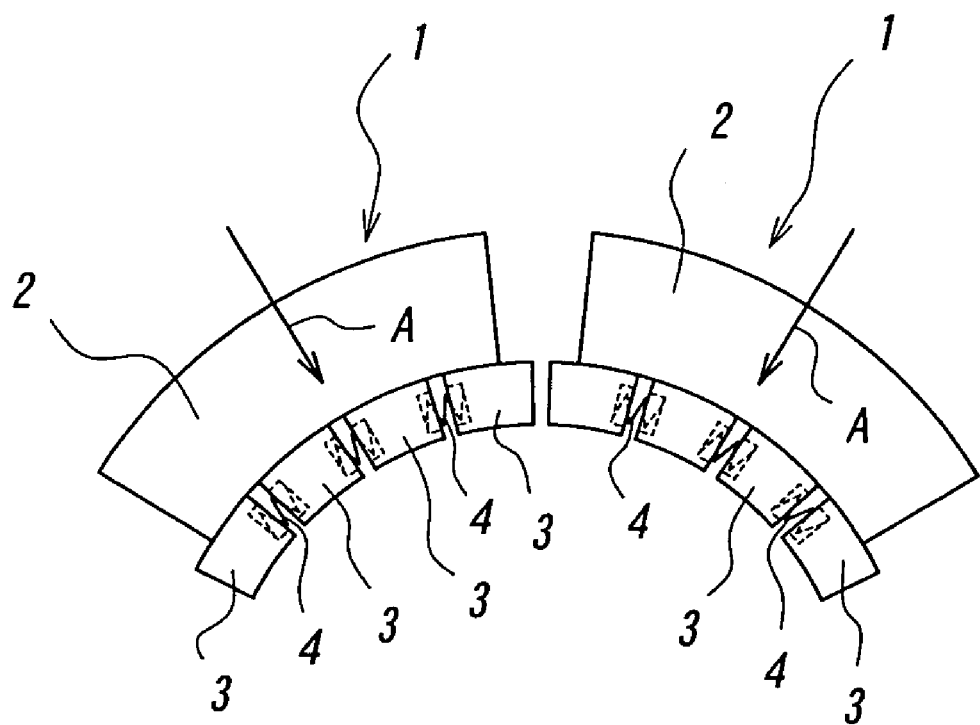
FIGS. 2a and 2b are schematic diagrams showing an embodiment according to the present invention.
Figure 2B:
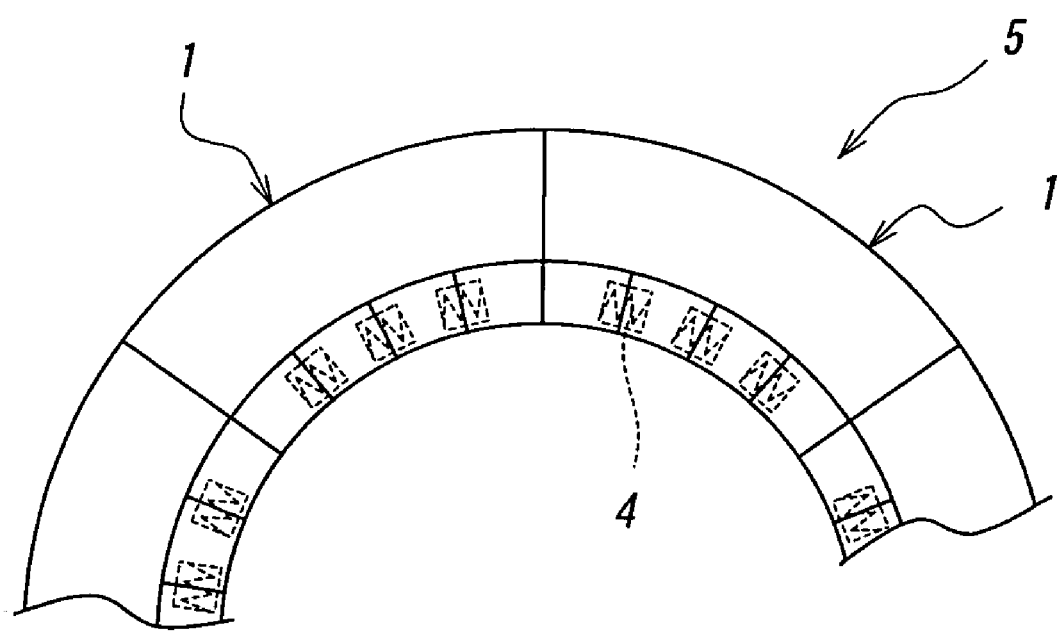

In an embodiment of the present invention shown in the FIGS. 2a and 2b, the reference numeral 1 designates a sector mold.

In this embodiment, a tread ring is composed of a total of, for example, eight sector molds 1 in a closing position. Each of the sector molds 1 comprises a segment 2 having a arched shape and, for example, four molding pieces 3 circumferentially aligned with each other and disposed on the inner surface side of the segments 2 to be able to move along a arched face. The molding pieces 3 of the sector molds are urged away from each other by a spring member 4 mounted therebetween.

In this case, each of adjacent molding pieces 3 is specified its spacing limit location by a not-shown stopper or the like and the maximum spacing distance is, for example, 0.5 mm, so that there is no possibility of each molding piece 3 being excessively displaced to fall away from the segment 2.

In a opening state of the vulcanizing mold or, directly, the sector molds 1 as shown in FIG. 2(a), each of the molding pieces 3 of the sector molds 1 is in the spacing position up to the limit location and each of the molding pieces 3 between the sector molds is also in the spacing position.

On the contrary, when each of the sector molds 1 is displaced radially inwardly, as shown by the arrow A in the figure, by closing the mold for vulcanizing and shaping a green tire, each of the molding pieces 3 between the adjacent sector molds tightly contacts with each other. Then, the clearances between the molding pieces 3 in the sector molds become smaller. Finally, the sector molds 1 form a tread ring 5 as shown in FIG. 2(*b*) at the completion of closing the molds and each of the molding pieces 3 in the sector molds is aligned with a clearance of less than 0.05 mm, which is the predefined gap.

Hence, the embodiment can significantly enhance the efficiency of venting air as compared with the prior art by venting air in the mold through between the molding pieces having wider clearances especially after each of the molding pieces 3 of the adjacent sector molds 1 tightly contacts with each other and before the completion of closing the mold. This is more effective when air is forcibly vented by means of vacuum suction.

Moreover, with using this mold, the clearance of the molding pieces becomes larger while opening the mold, so that the rubber can be effectively prevented from sticking between the molding pieces to assure the performance of venting air for a long period.

INDUSTRIAL APPLICABILITY

As having been clearly shown in the above description, according to the present invention, the capacity of venting air can be significantly improved owing particularly to the large clearances of the molding pieces of each sector mold, so that the formation of bares or the like can be effectively prevented even though almost all or all of the vent holes is eliminated.

In addition, the rubber is prevented from sticking between the molding pieces to assure the performance of venting air for a long period, so that a cycle of cleaning the mold can be largely extended, which enhances an operation efficiency of the mold.

The invention claimed is:

1. A vulcanizing mold for a tire, comprising a tread ring for vulcanizing and shaping a tread of the tire, the tread ring comprising plural sector molds which are separately formed in the circumferential direction so as to be brought into surface contact with each other, wherein each of the sector molds comprises a segment and plural movable molding pieces circumferentially aligned with each other and disposed on the inner surface side of the segment, each of the sector molds being arranged so as to contact with an adjacent sector mold in a complete closing position, and wherein the movable molding pieces of each sector mold are urged away from each other by separation members, the separation members are provided only between the movable molding pieces of each sector mold and urge away the movable molding pieces.

2. The vulcanizing mold for a tire according to claim 1, wherein a relative clearance of the movable molding pieces is less than 0.05 mm in the complete closing position in which the sector molds form the tread ring.

3. The vulcanizing mold for a tire according to claim 1, wherein the separation members are spring members.

* * * * *